United States Patent
Motomura

(10) Patent No.: US 8,351,624 B2
(45) Date of Patent: Jan. 8, 2013

(54) AUDIO OUTPUT APPARATUS, AUDIO INPUT APPARATUS, AUDIO CONTROL APPARATUS, AUDIO CONTROL SYSTEM, AND AUDIO CONTROL METHOD

(75) Inventor: Kensuke Motomura, Kanagawa (JP)

(73) Assignee: Sony Corporation (JP)

( * ) Notice: Subject to any disclaimer, the term of this patent is extended or adjusted under 35 U.S.C. 154(b) by 960 days.

(21) Appl. No.: 12/214,195

(22) Filed: Jun. 17, 2008

(65) Prior Publication Data

US 2008/0309830 A1    Dec. 18, 2008

(30) Foreign Application Priority Data

Jun. 18, 2007 (JP) ................ P2007-160703
Aug. 29, 2007 (JP) ................ P2007-222704

(51) Int. Cl.
*G02B 1/00* (2006.01)
*H04R 3/02* (2006.01)
*H04R 29/00* (2006.01)
*H03G 3/00* (2006.01)
*H04N 5/258* (2006.01)

(52) U.S. Cl. ........ 381/123; 348/738; 348/705; 348/706; 381/74; 381/58; 381/105

(58) Field of Classification Search ............... 348/738, 348/706, 734; 381/58, 105; 375/240.1, 211
See application file for complete search history.

(56) References Cited

U.S. PATENT DOCUMENTS

| | | | | |
|---|---|---|---|---|
| 2003/0185400 | A1* | 10/2003 | Yoshizawa et al. | 381/58 |
| 2006/0095596 | A1* | 5/2006 | Yung et al. | 710/5 |
| 2006/0256241 | A1* | 11/2006 | Suzuki et al. | 348/706 |
| 2009/0046210 | A1* | 2/2009 | Sakamoto et al. | 348/738 |
| 2009/0051825 | A1* | 2/2009 | Asayama et al. | 348/738 |
| 2009/0262256 | A1* | 10/2009 | Asayama et al. | 348/738 |

FOREIGN PATENT DOCUMENTS

| | | |
|---|---|---|
| JP | 2003298975 A | 10/2003 |
| JP | 2006333238 A | 12/2006 |
| JP | 2007-104138 A | 4/2007 |
| JP | 2007-124469 A | 5/2007 |
| JP | 2007124552 A | 5/2007 |

OTHER PUBLICATIONS

"High-Definition Multimedia Interface", Specification version 1.1 May 20, 2004.*

* cited by examiner

*Primary Examiner* — Asok Sarkar
*Assistant Examiner* — Dmitriy Yemelyanov
(74) *Attorney, Agent, or Firm* — Lerner, David, Littenberg, Krumholz & Mentlik, LLP

(57) ABSTRACT

An audio output apparatus which outputs an audio signal to an audio control apparatus controlling processing of the audio signal, and to which an external device having an external terminal is connectable includes an output terminal, a detecting section, a generating section, and a transmitting section. The output terminal is connected with the external terminal and outputs the audio signal to the external device via the external terminal. The detecting section detects whether or not the external terminal is connected to the output terminal. The generating section generates a control signal based on a result of the detection by the detecting means. The transmitting section transmits the generated control signal to the audio control apparatus in order that the audio control apparatus controls the processing of the audio signal based on the control signal.

7 Claims, 10 Drawing Sheets

AUDIO OUTPUT APPARATUS, AUDIO INPUT APPARATUS, AUDIO CONTROL APPARATUS, AUDIO CONTROL SYSTEM, AND AUDIO CONTROL METHOD

CROSS-REFERENCE TO RELATED APPLICATIONS

The present application claims priority from Japanese Patent Application No. JP 2007-160703 filed in the Japanese Patent Office on Jun. 18, 2007 and Japanese Patent Application No. JP 2007-222704 filed in the Japanese Patent Office on Aug. 29, 2007, the entire contents of which are incorporated herein by reference.

BACKGROUND OF THE INVENTION

1. Field of the Invention

The present invention relates to an audio output apparatus, an audio input apparatus, an audio control apparatus, an audio control system, and an audio control method that are capable of controlling at least an audio signal between two or more apparatuses connected with an HDMI (High-Definition Multimedia Interface).

2. Description of the Related Art

In the past, there have been systems in which a television receiver (hereinafter referred to as a "TV") and an AV (Audio Visual) amplifier are connected with, for example, an HDMI (see Patent Document 1, for example).

In Patent Document 1, the TV is a sink device, the AV amplifier is a repeater device, and a DVD player is a source device, and a video signal out of audio and video signals transmitted from the DVD player is basically retransmitted from the AV amplifier to the TV and outputted as video by the TV. The audio signal is sometimes processed inside the AV amplifier and audio-outputted by an external speaker or sometimes retransmitted to the TV and audio-outputted by a speaker built into the TV.

Moreover, of course, a case where the TV is a source device and the AV amplifier is a sink device is also conceivable, and alternatively, if in each device, the HDMI has two lines for input and output, bidirectional communication of audio and video signals between these devices becomes possible.
(Patent Document 1)
Japanese Patent Application Laid-Open No. 2007-124469 (paragraph [0013], FIG. 1)

SUMMARY OF THE INVENTION

For example, when a user changes the volume of sound by a speaker built into a TV or mutes audio in a case where a system is constructed by the above HDMI connection, there is a problem that an AV amplifier connected to the TV cannot exercise control thereof. Accordingly, when the user tries to manipulate an output from an external speaker connected to the AV amplifier, the user needs to manipulate the AV amplifier, which takes time and effort.

In view of the above circumstances, it is desirable to provide an audio output apparatus, an audio input apparatus, an audio control apparatus, an audio control system, and an audio control method which the user can easily manipulate.

According to an embodiment of the present invention, there is provided an audio output apparatus which outputs an audio signal to an audio control apparatus controlling processing of the audio signal, and to which an external device having an external terminal is connectable. The audio output apparatus includes an output terminal, a detecting means, a generating means, and a transmitting means. The output terminal is connected to the external terminal and outputs the audio signal to the external device via the external terminal. The detecting means detects whether or not the external terminal is connected to the output terminal. The generating means generates a control signal based on a result of the detection by the detecting means. The transmitting means transmits the generated control signal to the audio control apparatus in order that the audio control apparatus controls the processing of the audio signal based on the control signal.

In the embodiment of the present invention, it is detected whether or not the external terminal is connected to the output terminal, and based on the control signal from the result of the detection, the audio processing of the audio control apparatus is controlled. Accordingly, the user is saved the trouble of manipulating the audio control apparatus, whereby the manipulation becomes easier.

The "audio signal" is an "audio" signal in a comprehensive meaning, and the type, waveform, format, and so on of the signal are not limited. In other words, even the description "the audio signal" refers to an "audio signal" of a comprehensive concept. The same goes for the following embodiments of the invention.

In the embodiment of the present invention, the transmitting means has an HDMI capable of transmitting the audio signal and the control signal. In other words, the control signal is transmitted to the audio control apparatus using the HDMI, so it becomes unnecessary to provide a dedicated line to transmit the control signal.

In the embodiment of the present invention, the audio output apparatus further includes an output means for outputting the audio signal in a format different from that of the HDMI. For example, the output means can output a compressed audio signal compressed in a predetermined format. Consequently, for example, when the audio control apparatus transfers the compressed audio signal to another device or records it in a recording device, the transfer time can be reduced or the storage capacity of the recording device can be reduced. Further, the necessity for the audio control apparatus to perform compression processing is eliminated, thereby enabling a reduction in load on the audio control apparatus. The above recording device may be built into the audio control apparatus, or may be a recording device separate from the audio control apparatus.

In the embodiment of the present invention, the transmitting means transmits the control signal via a CEC (Consumer Electronics Control) line of the HDMI.

In the embodiment of the present invention, the HDMI is of one of a wireless type and a wired type.

In the embodiment of the present invention, the external device is one of headphones, earphones, a head-mounted speaker, and a stationary speaker.

An audio control apparatus according to an embodiment of the present invention is an audio control apparatus to which an audio signal outputted from an audio output apparatus is inputted, the audio output apparatus having an output terminal outputting the audio signal to an external device via an external terminal of the external device. The audio control apparatus includes an audio processing unit, a receiving means, and a control means. The audio processing unit processes the audio signal. When the audio output apparatus detects whether or not the external terminal is connected to the output terminal, generates a control signal based on a result of the detection, and transmits the generated control signal, the receiving means receives the transmitted control signal. The control means controls the processing of the audio signal by the audio processing unit based on the received control signal.

In the embodiment of the present invention, the receiving means has an HDMI capable of receiving the audio signal and the control signal. In other words, the control signal is transmitted from the audio output apparatus and received by the receiving means using the HDMI, whereby it becomes unnecessary to provide a dedicated line to transmit the control signal.

An audio control system according to an embodiment of the present invention is an audio control system to which an external device having an external terminal is connectable. The audio control system includes an audio output apparatus and an audio control apparatus. The audio output apparatus outputs an audio signal to the external device and includes an output terminal outputting the audio signal to the external device via the external terminal, a detecting means for detecting whether or not the external terminal is connected to the output terminal, a generating means for generating a control signal based on a result of the detection by the detecting means, and a transmitting means for transmitting the generated control signal. The audio control apparatus has an audio processing unit to which the outputted audio signal is inputted and which processes the inputted audio signal, a receiving means for receiving the transmitted control signal, and a control means for controlling the processing of the audio signal by the audio processing unit based on the received control signal.

An audio input apparatus according to an embodiment of the present invention is an audio input apparatus to which an audio signal outputted from an audio control apparatus controlling processing of the audio signal is inputted, and to which an external device having an external terminal is connectable. The audio input apparatus includes an output terminal, a detecting means, a generating means, and a transmitting means. The output terminal is connected to the external terminal and outputs the inputted audio signal to the external device via the external terminal. The detecting means detects whether or not the external terminal is connected to the output terminal. The generating means generates a control signal based on a result of the detection by the detecting means. The transmitting means transmits the generated control signal to the audio control apparatus in order that the audio control apparatus controls the processing of the audio signal based on the control signal. The audio control apparatus outputs the audio signal and inputs the outputted audio signal to the audio input apparatus. The audio input apparatus typically reproduces the inputted audio signal.

An audio control apparatus according to another embodiment of the present invention is an audio control apparatus which outputs an audio signal to an audio input apparatus having an output terminal outputting the audio signal to an external device via an external terminal of the external device. The audio control apparatus includes an audio processing unit, a receiving means, and a control means. The audio processing unit processes the audio signal. When the audio input apparatus detects whether or not the external terminal is connected to the output terminal, generates a control signal based on a result of the detection, and transmits the generated control signal, the receiving means receives the transmitted control signal. The control means controls the processing of the audio signal by the audio processing unit based on the received control signal.

In the embodiment of the present invention, the audio control apparatus further includes an audio input means to which the audio signal transmitted from an audio transmission apparatus is inputted, and the control means controls the processing of the inputted audio signal by the audio processing unit. The above audio input means may be an interface in an HDMI format or may be an interface in a format different from that of the HDMI.

An audio control system according to another embodiment of the present invention is an audio control system including an audio input apparatus to which an external device having an external terminal is connectable and an audio control apparatus outputting an audio signal to the audio input apparatus. The audio input apparatus has an input means to which the audio signal outputted from the audio control apparatus is inputted, an output terminal outputting the inputted audio signal to the external device via the external terminal, a detecting means for detecting whether or not the external terminal is connected to the output terminal, a generating means for generating a control signal based on a result of the detection by the detecting means, and a transmitting means for transmitting the generated control signal. The audio control apparatus has an audio processing unit processing the audio signal, a receiving means for receiving the transmitted control signal, and a control means for controlling the processing of the audio signal by the audio processing unit based on the received control signal. The above input means may be an interface in an HDMI format or may be an interface in a format different from that of the HDMI.

An audio control method according to an embodiment of the present invention includes detecting whether or not an external terminal of an external device is connected to an output terminal outputting an audio signal to the external device via the external terminal, generating a control signal based on a result of the detection, transmitting the generated control signal, receiving the transmitted control signal, and controlling processing of the audio signal by an audio processing unit based on the received control signal.

In the embodiment of the present invention, the audio signal is outputted from an audio output apparatus having the output terminal, the control signal is transmitted from the audio output apparatus having the output terminal, and an audio control apparatus, which has the audio processing unit and to which the audio signal outputted from the audio output apparatus is inputted, receives the transmitted control signal and controls the processing of the audio signal by the audio processing unit based on the received control signal. In other words, in the embodiment of the present invention, the audio output apparatus outputs the audio signal to the audio control apparatus, and the audio signal is inputted to the audio control apparatus.

Alternatively, the audio signal may be outputted from an audio control apparatus having the audio processing unit to an audio input apparatus having the output terminal, and the audio signal inputted to the audio input apparatus may be outputted to the external device via the output terminal and the external terminal by the audio input apparatus. In other words, in the embodiment of the present invention, the audio control apparatus outputs the audio signal to the audio input apparatus, and the audio signal is inputted to the audio input apparatus.

An audio output apparatus according to still another embodiment of the present invention is an audio output apparatus which outputs an audio signal to an audio control apparatus controlling processing of the audio signal. The audio output apparatus includes a manipulation detecting means, a generating means, and a transmitting means. The manipulation detecting means detects a manipulation signal generated by an input manipulation of a user. The generating means generates a control signal based on a result of the detection by the manipulation detecting means. The transmitting means transmits the control signal to the audio control apparatus in order that the audio control apparatus controls processing of the audio signal based on the control signal.

An audio control apparatus according to yet another embodiment of the present invention is an audio control apparatus to which an audio signal outputted from an audio output apparatus is inputted. The audio control apparatus includes an audio processing unit, a receiving means, and a control means. The audio processing unit processes the audio signal. When the audio output apparatus detects a manipulation signal generated by an input manipulation of a user, generates a control signal based on a result of the detection, and transmits the generated control signal, the receiving means receives the transmitted control signal. The control means controls the processing of the audio signal by the audio processing unit based on the received control signal.

An audio control system in which the audio output apparatus and the audio control apparatus according to the above embodiments of the present invention are combined is also conceivable. The same goes for the following audio input apparatus and audio control apparatus according to respective embodiments of the present invention.

An audio input apparatus according to still another embodiment of the present invention is an audio input apparatus to which an audio signal outputted from an audio control apparatus controlling processing of the audio signal is inputted. The audio input apparatus includes a manipulation detecting means, a generating means, and a transmitting means. The manipulation detecting means detects a manipulation signal generated by an input manipulation of a user. The generating means generates a control signal based on a result of the detection by the manipulation detecting means. The transmitting means transmits the control signal to the audio control apparatus in order that the audio control apparatus controls the processing of the audio signal based on the control signal.

An audio control apparatus according to yet another embodiment of the present invention is an audio control apparatus which outputs an audio signal to an audio input apparatus. The audio control apparatus includes an audio processing unit, a receiving means, and a control means. The audio processing unit processes the audio signal. When the audio input apparatus detects a manipulation signal generated by an input manipulation of a user, generates a control signal based on a result of the detection, and transmits the generated control signal, the receiving means receives the transmitted control signal. The control means controls the processing of the audio signal by the audio processing unit based on the received control signal.

As described above, according to the embodiments of the present invention, the user is saved the trouble of manipulating the audio control apparatus, whereby the manipulation becomes easier. Moreover, for example, in the case of the audio control system constituted by the audio output apparatus and the audio control apparatus having the built-in recording device, with respect to the audio output control of the audio control apparatus due to a mute manipulation or an insertion manipulation of headphones or the like by the user, it is possible to flexibly cope with accumulation of audio data in the recording device and with the audio output control.

These and other objects, features and advantages of the present invention will become more apparent in light of the following detailed description of best mode embodiments thereof, as illustrated in the accompanying drawings.

DESCRIPTION OF PREFERRED EMBODIMENTS

Embodiments of the present invention will be described below with reference to the drawings.

Figure 1:
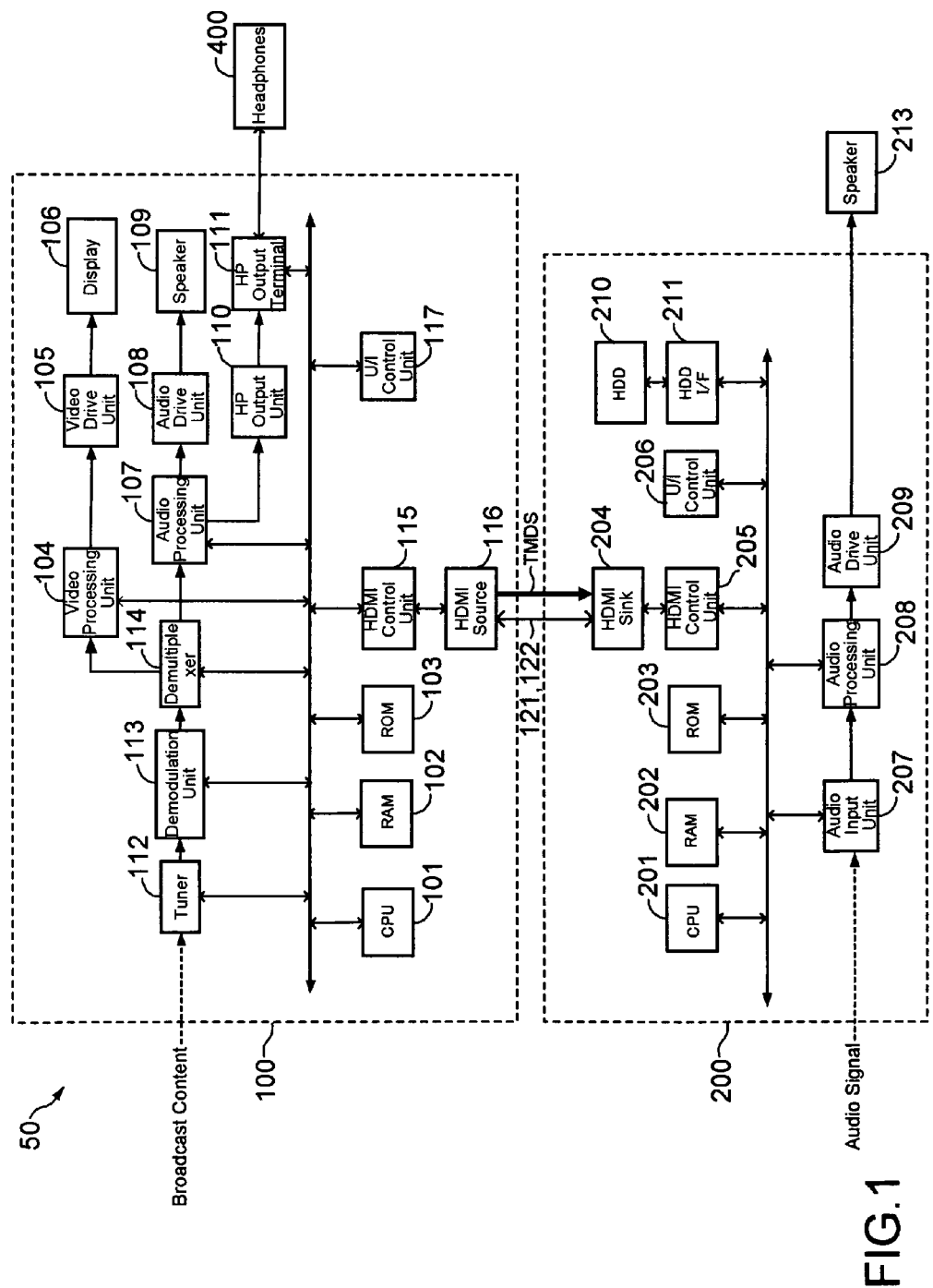
FIG. 1 is a block diagram showing a configuration of an audio control system according to an embodiment of the present invention.

FIG. 1 is a block diagram showing a configuration of an audio control system according to an embodiment of the present invention.

An audio control system 50 includes, for example, a TV 100 as an audio output apparatus and an AV amplifier 200 as an audio control apparatus.

Examples of the audio output apparatus include, in addition to the TV 100, a tuner apparatus without a display 106, an apparatus which extracts an AV signal from various recording media and outputs the signal to an external apparatus, and an apparatus as a combination of the above apparatuses.

The audio control apparatus is not limited to the AV amplifier 200, and may have a tuner function in addition to the function of the AV amplifier 200. Alternatively, as the audio control apparatus, a recorder capable of recording not only an audio signal but also a video signal on a recording medium, or the like may be used.

The TV 100 includes a CPU 101, a RAM 102, a ROM 103, a tuner 112, a demodulation unit 113, a demultiplexer 114, a video processing unit 104, an audio processing unit 107, a video drive unit 105, a display 106, an audio drive unit 108, a speaker 109, an HP (headphones) output unit 110, an HP output terminal 111, a U/I (User Interface) control unit 117, an HDMI control unit 115, and an HDMI source 116.

The CPU 101 collectively controls the entire TV 100. The ROM 103 stores necessary programs and the RAM 102 has areas to develop the programs, the ROM 103 and the RAM 102 functioning as work areas of the CPU 101.

The tuner 112 includes a digital tuner for digital broadcasting and an analog tuner for analog broadcasting. Two or more tuners 112 may be provided. The analog tuner may be eliminated. Hereinafter, a description will be given assuming that the tuner 112 receives a digital broadcast wave. The demodulation unit 113 demodulates a modulated wave signal supplied from the tuner 112 and performs error correction processing, frame reconstruction, and so on. The demultiplexer 114 separates audio and video multiplexed data such as a data stream supplied from the demodulation unit 113 into audio data and video data.

The video processing unit 104 decodes the video data encoded (or compressed) in an MPEG (Moving Picture Experts Group) format or another format. The video drive unit 105 performs a D/A conversion or the like on the data supplied from the video processing unit and drives the display 106 in response to a video signal converted into an analog signal.

The audio processing unit 107 similarly decodes the audio data encoded (or compressed) in a predetermined format. The audio drive unit 108 performs a D/A conversion or the like on the data supplied from the audio processing unit 107 and drives the built-in speaker 109 in response to an audio signal converted into an analog signal.

Hereinafter, a signal including at least one of the video signal and the audio signal may be referred to as AV signal in some cases.

The HP output unit 110 supplies the analog audio signal supplied from the audio processing unit 107 to the HP output terminal 111. The HP output terminal 111 is a connecting terminal to which a detachable external terminal is connected. Examples of a device having the external terminal include headphones, earphones, and other head-mounted speakers and stationary speakers. Hereinafter, a description will be given assuming that the HP output terminal 111 is a terminal to which (an output terminal of) headphones 400 is connected.

The U/I control unit 117 receives a manipulation signal inputted by a user using a remote controller for remotely controlling the TV 100 or a manipulation signal inputted by the user via a manipulation button or the like provided on a manipulation panel of the TV 100, and transmits the received manipulation signal to the CPU 101. Examples of the manipulation signal include various signals of power-on and power-off of the TV 100, a channel selection by the tuner 112, a manipulation regarding video, and a manipulation regarding audio.

Regarding an output mode of the AV signal, there are, for example, a blackout mode, a multi-screen mode, a mute mode, and a multiplexed audio output mode. In these cases, the CPU 101 and so on function as a generating means for generating a control signal to execute any of these output modes in response to the above manipulation signal. In this case, the control signal may be the manipulation signal itself.

Moreover, as will be described later, the CPU 101 functions as a detecting means for detecting whether or not the headphones are connected to the HP output terminal 111, and generates the control signal associated with the above output mode when the connection of the headphones is detected.

The HDMI control unit 115 controls the transmission and reception of the AV signal and the control signal by the HDMI source 116.

The AV amplifier 200 includes a CPU 201, a RAM 202, a ROM 203, an audio input unit 207, an audio processing unit 208, an audio drive unit 209, an HDD (Hard Disk Drive) 210, an interface 211 of the HDD 210, a U/I control unit 206, an HDMI control unit 205, and an HDMI sink 204.

The CPU 201 collectively controls the entire AV amplifier 200. The ROM 203 stores programs necessary to implement this embodiment and the RAM 202 has areas to develop the programs, the ROM 203 and the RAM 202 functioning as work areas of the CPU 201.

The HDMI control unit 205 controls the transmission and reception of the AV signal and the control signal by the HDMI sink 204. The audio signal in a format different from an HDMI format is inputted to the audio input unit 207. The audio input unit 207 has, for example, an RCA or optical digital interface. The audio processing unit 208 performs processing of encoding, decoding, volume control, or the like of the audio signal in the HDMI format and the audio signal inputted via the audio input unit 207.

The HDD 210 records audio data encoded, for example, by the audio processing unit 208.

The U/I control unit 206 receives a manipulation signal inputted by the user from a remote controller for remotely controlling the AV amplifier 200 or a manipulation signal inputted by the user via a manipulation button or the like provided on a manipulation panel of the AV amplifier 200, and transmits the received manipulation signal to the CPU 201.

The audio drive unit 209 generates a drive signal to drive an external speaker 213 in response to the audio signal processed by the audio processing unit 208. The speaker 213 may be built into the AV amplifier 200.

Figure 2:
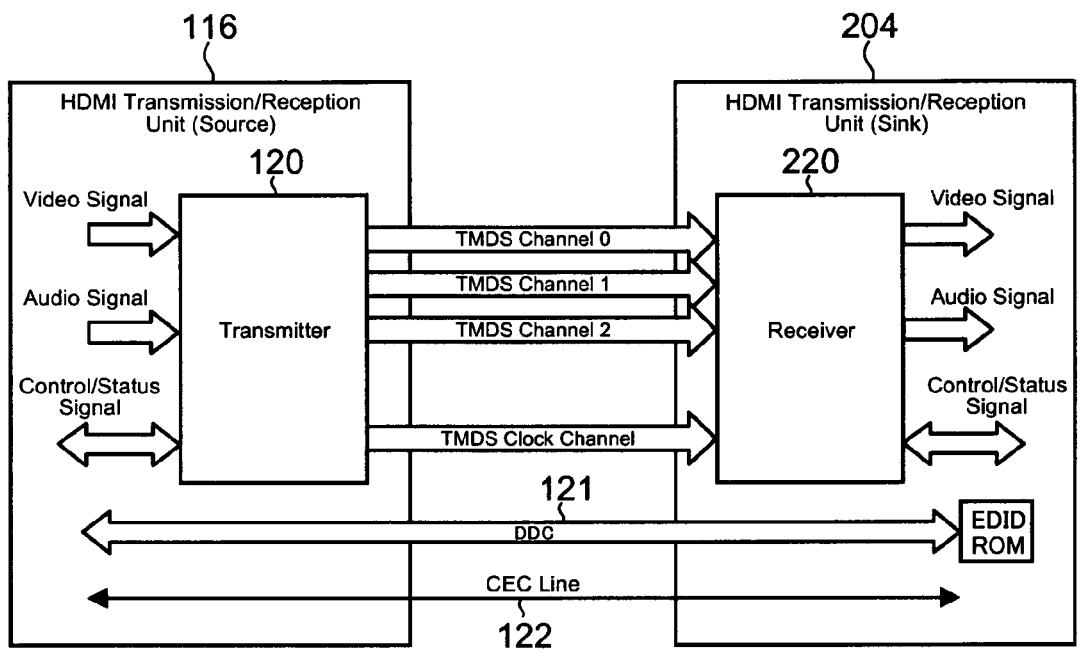
FIG. 2 is a diagram showing a basic electrical configuration of an HDMI.

FIG. 2 is a diagram showing the basic electrical configurations of the HDMI source 116 and the HDMI sink 204.

In this embodiment, the HDMI source 116 of the TV 100 becomes a source (HDMI output unit), and the HDMI sink 204 of the AV amplifier 200 becomes a sink (HDMI input unit). Needless to say, this is a mere example and various changes can be made depending on devices. Some devices have both HDMIs of a source and a sink.

In the HDMI source 116, the video signal, the audio signal, and a clock signal thereof are transmitted by a transmitter 120, and in the HDMI sink 204, these signals are received by a receiver 220. As a transmission method of these signals, a TMDS (Transition Minimized Differential Signaling) method is used. Further, the HDMI includes a DDC (Display Data Channel) 121 that transmits unique information on the display 106 and so on and a CEC (Consumer Electronics Control) line 122 as a control line. The CEC line 122 is a bidirectional communication line.

The HDMI source 116 and the HDMI sink 204 may be connected by wire or may be connected by wireless.

The TV 100 and the AV amplifier 200 are connected by the HDMI source 116 and the HDMI sink 204, and the video signal, the audio signal, and so on are supplied from the TV 100 to the AV amplifier 200 through this connection. Accordingly, the audio signal of the TV 100 can be reproduced by either the speaker 109 or the speaker 213. It is only necessary that the speaker 109 or the speaker 213 to reproduce the supplied signal be set according to an input manipulation to the TV 100 or an input manipulation to the AV amplifier 200 by the user. Alternatively, it is only necessary that the speaker 109 or the speaker 213 to reproduce the supplied signal be set according to whether or not an HDMI cable is connected between the devices 100 and 200. Here, it is assumed that a setting is made such that the audio signal of the TV 100 is reproduced by the speaker 213 instead of the speaker 109 as will be described later.

The TV 100 outputs the video signal processed by the video processing unit 104 to the video drive unit 105 and the HDMI control unit 115. The audio signal processed by the audio processing unit 107 is outputted to the HP output unit 110 and the HDMI control unit 115 but not to the audio drive unit 108. The AV signal of the video signal and the audio signal supplied to the HDMI control unit 115 is outputted to the AV amplifier 200 via the HDMI source 116. The AV amplifier 200 outputs the audio signal of the AV signal received by the HDMI sink 204 to the external speaker 213 via the audio processing unit 208 and the audio drive unit 209.

The audio signal of the TV 100 is reproduced by the speaker 213 instead of the speaker 109 by the above operation.

Figure 3:
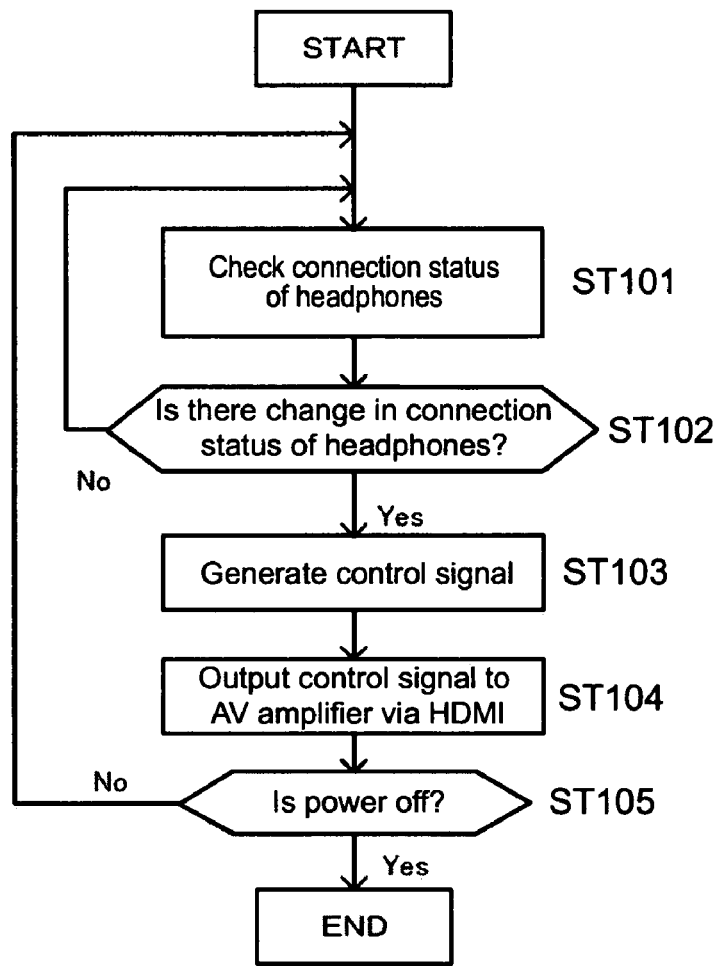
FIG. 3 is a flowchart showing an operation of a TV.
Figure 4:
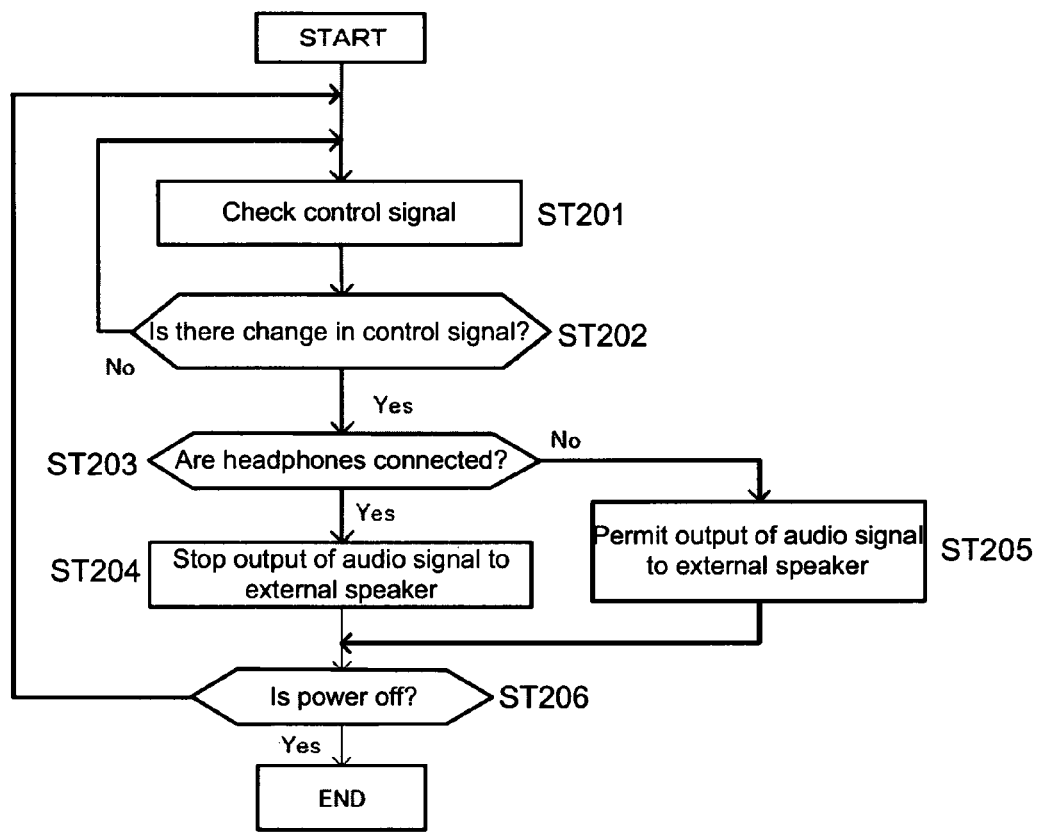
FIG. 4 is a flowchart showing an operation of an AV amplifier in the case of FIG. 3.

Next, an example of the operation of the audio control system 50 will be described. FIG. 3 is a flowchart showing the operation of the TV 100, and FIG. 4 is a flowchart showing the operation of the AV amplifier 200 at that time. FIG. 3 shows an example of the operation regarding the connection/non-connection of the headphones 400 to the HP output terminal 111 as described above.

The CPU 101 of the TV 100 checks whether or not the headphones 400 are connected to the HP output terminal 111 (Step 101) and advances to Step 102. In Step 102, when detecting a change in connection status, for example, from connection to non-connection or from non-connection to connection, the CPU 101 advances to Step 103. When detecting no change in the connection status, the CPU 101 returns to Step 101. In Step 103, the CPU 101 generates the control signal according to whether or not the headphones 400 are connected to the HP output terminal 111, and advances to Step 104. The control signal is, for example, a signal indicating that the connection of the headphones 400 has been detected, an example of which is a signal of "headphones present". Alternatively, the control signal is, for example, a signal indicating that the connection of the headphones 400 is not detected, an example of which is a signal of "no headphones".

In Step 104, the CPU 101 transmits the control signal of "headphones present" or "no headphones" to the HDMI source 116 and outputs the signal to the AV amplifier 200 via the HDMI, and advances to Step 105. The control signal is outputted via the CEC line 122. In Step 105, the CPU 101 checks the power status of the TV 100, and when the power is off, ends the operation shown in the flowchart of FIG. 3, and when the power is on, returns to Step 101.

Control in which Step 102 is deleted and Step 101 advances directly to Step 103 in the flowchart of FIG. 3 is also conceivable. In this case, the CPU 101 checks whether or not the headphones 400 are connected to the HP output terminal 111 (Step 101), generates the control signal based on a result of the check, and outputs the control signal to the AV amplifier 200 via the HDMI, a detailed description of which is omitted here.

The CPU 201 of the AV amplifier 200 receives the AV signal and the control signal via the HDMI sink 204. The CPU 201 checks the control signal via the HDMI sink 204 (Step 201) and advances to Step 202. In Step 202, when there is a change in the control signal (for example, from the control signal of "headphones present" to the control signal of "no headphones"), the CPU 201 advances to Step 203. When there is no change in the control signal, the CPU 201 returns to Step 201.

In the case of the change from the control signal of "headphones present" to the control signal of "no headphones", the CPU 201 advances from Step 203 to Step 205. In the case of the change from the control signal of "no headphones" to the control signal of "headphones present", the CPU 201 advances from Step 203 to Step 204. In Step 204, the CPU 201 controls the audio processing unit 208 so that an audio output from the audio processing unit 208 to the audio drive unit 209 is stopped. In Step 205, the CPU 201 controls the audio processing unit 208 so that the audio output from the audio processing unit 208 to the audio drive unit 209 is permitted. When the processing of Steps 204 and 205 ends, the CPU 201 advances to Step 206 and ends the operation shown in the flowchart of FIG. 4 when the AV amplifier 200 is powered off.

When the AV amplifier is being powered on, the CPU 201 returns to Step 201 and continues the operation in the flowchart of FIG. 4.

As just described, the audio output of the AV amplifier 200 to the speaker 213 is controlled according to the connection status of the headphones 400 to the TV 100. Consequently, when the headphones 400 are connected to the TV 100, sound can be prevented from being outputted from the speaker 213 connected to the AV amplifier 200. In other words, the AV amplifier 200 performs mute control without the user manipulating the AV amplifier 200, which can save the user the trouble of manipulation.

Moreover, the control signal is transmitted to the AV amplifier using the HDMI, whereby it becomes unnecessary to provide a dedicated line to transmit the control signal.

Further, the AV amplifier 200 includes the HDD 210. Therefore, after performing encoding processing or the like on the audio signal from the TV 100 received by the HDMI sink 204 in the audio processing unit 208, the CPU 201 can transmit the audio signal to the HDD 210 and store the signal in the HDD 210. Furthermore, as described above, after performing volume control on the audio signal from the TV 100 received by the HDMI sink 204 in the audio processing unit 208, the CPU 201 can also transmit the audio signal to the audio drive unit 209, drive the signal by the audio drive unit 209, and reproduce the signal by the speaker 213. In this case, the CPU 201 can perform the following four (a to d) controls on the audio signal from the TV 100 received by the HDMI sink 204.

(a) The audio signal is permitted to be stored in the HDD 210 and is not reproduced by the speaker 213.

(b) The audio signal is permitted to be stored in the HDD 210 and is reproduced by the speaker 213.

(c) The audio signal is not permitted to be stored in the HDD 210 and is not reproduced by the speaker 213.

(d) The audio signal is not permitted to be stored in the HDD 210 and is reproduced by the speaker 213.

Setting of permission/non-permission of storage in the HDD 210 has only to be selected when, for example, the user manipulates the TV 100 through a setting screen or the like displayed on the TV 100. In this case, as the control signal of FIGS. 3 and 4, for example, any of the following four (0, 1, 2, 3) control signals may be used.

0: control signal of "recording permitted" indicating permission of the storage into the HDD 210 and "headphones present"

1: control signal of "recording permitted" and "no headphones"

2: control signal of "recording not permitted" indicating non-permission of the storage into the HDD 210 and "headphones present"

3: control signal of "recording not permitted" and "no headphones"

For example, when the user permits the storage in the HDD 210 via the setting screen or the like of the TV 100, in Step 103 of FIG. 3, the above 0 control signal is generated when the connection of the headphones 400 is detected, and the above 1 control signal is generated when the non-connection of the headphones 400 is detected. When the user does not permit the storage into the HDD 210 via the setting screen or the like of the TV 100, in Step 103 of FIG. 3, the above 2 control signal is generated when the connection of the headphones 400 is detected, and the above 3 control signal is generated when the non-connection of the headphones 400 is detected.

In FIG. 4, the CPU 201 advances to Step 204 when receiving the above 0 or 2 control signal ("headphones present").

The CPU 201 advances to Step 205 in the case of the above 1 or 3 control signal ("no headphones").

Also in this case, the audio output of the AV amplifier 200 to the speaker 213 is controlled according to the connection status of the headphones 400 to the TV 100. This can prevent sound from being outputted from the speaker 213 connected to the AV amplifier 200 when the headphones 400 are connected to the TV 100, while supporting the setting of the storage into the HDD 210 made by the user.

Moreover, in an audio output apparatus of related art that corresponds to the TV 100, audio muting due to a mute manipulation or an insertion manipulation of headphones by the user is generally performed by mute processing inside this audio output apparatus. In such a case, in a system of related art that corresponds to the audio control system 50, the audio signal is subjected to the mute processing inside the TV 100, which causes a problem that the audio signal cannot be stored in the HDD 210 of the AV amplifier 200. In the system of FIGS. 3 and 4 according to the above embodiment, however, the audio signal of the TV 100 can be flexibly coped with such that the audio signal is subjected to mute processing in the speaker 213 while being stored in the HDD 210.

Figure 5:
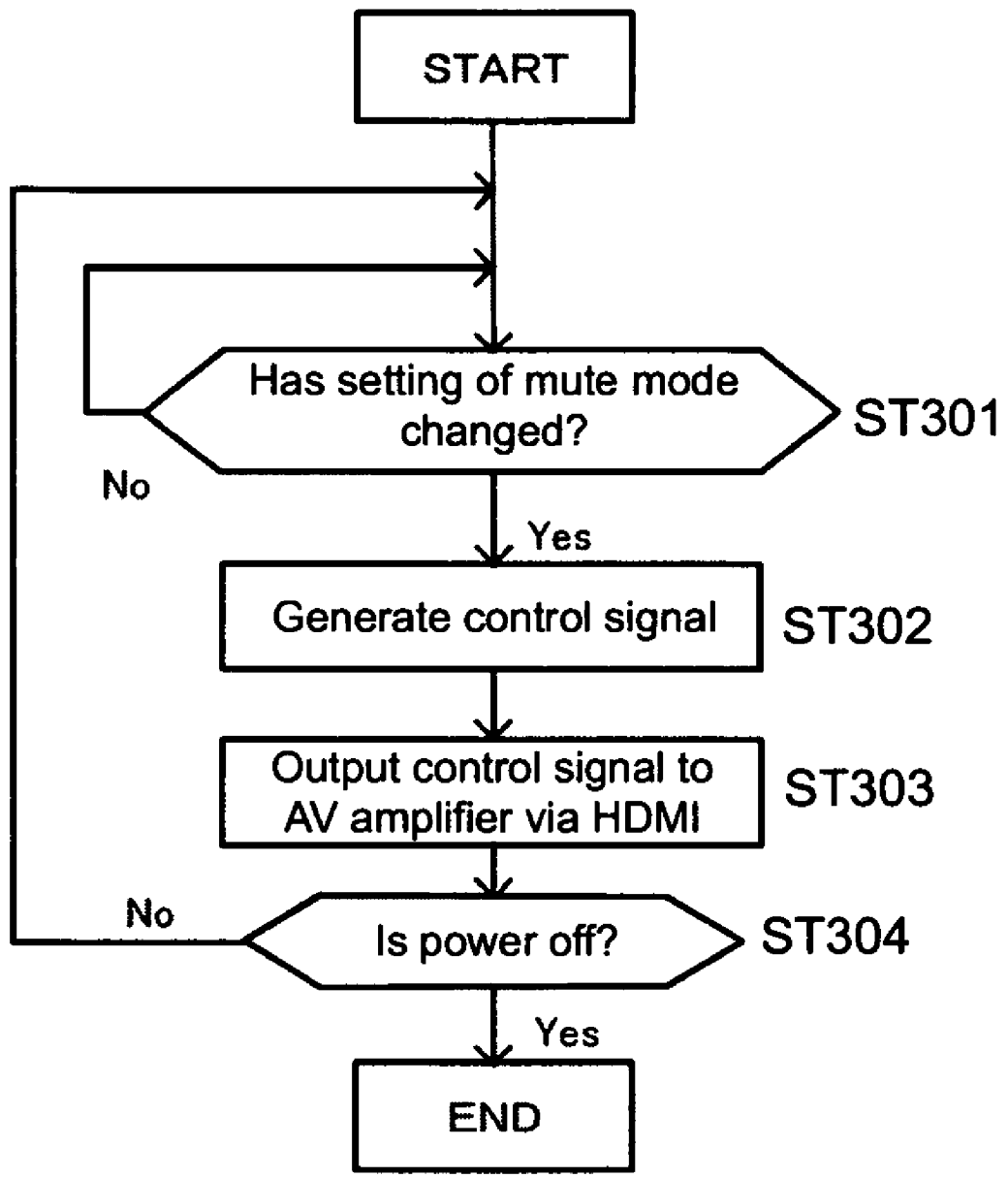
FIG. 5 is a flowchart showing an operation of the TV according to another embodiment of the present invention.
Figure 6:
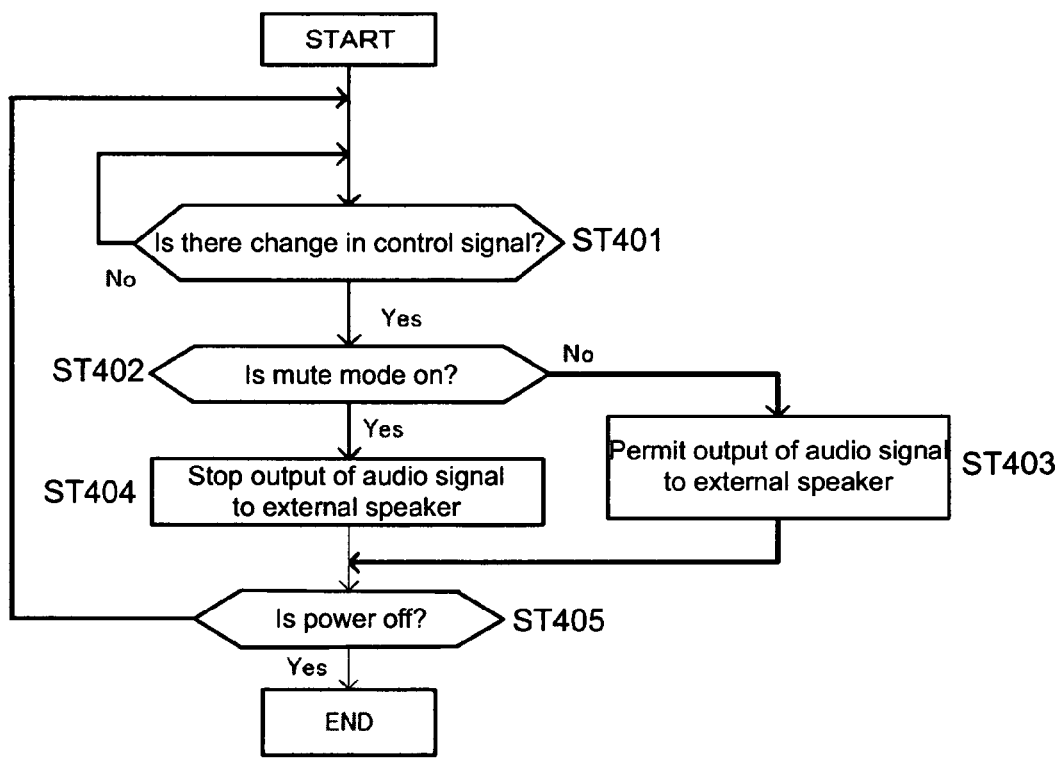
FIG. 6 is a flowchart showing an operation of the AV amplifier in the case of FIG. 5.

FIGS. 5 and 6 are flowcharts of operations of the TV 100 and the AV amplifier 200, respectively, according to another embodiment of the present invention. This embodiment is an embodiment in which a control signal corresponding to the manipulation signal to the TV 100 input by the user is used. For example, the manipulation by the user to the TV 100 includes selection of the mute mode. The mute mode proposed in this embodiment is a mode in which the system of the audio control system 50 is controlled so that when the audio signal of the TV 100 is reproduced by the speaker 213 via the AV amplifier 200, the audio signal is not outputted to the speaker 213 when the mute mode is on and the audio signal is outputted to the speaker 213 when the mute mode is off.

Referring to FIG. 5, the flowchart of the TV 100 regarding the above mute mode will be described. It is assumed that the CPU 101 of the TV 100 outputs the audio signal processed by the audio processing unit 107 to the AV amplifier 200 via the HDMI source 116. For example, when the setting of the mute mode is changed by the manipulation of the user (Yes in Step 301), the CPU 101 generates the control signal corresponding to the manipulation signal of the mute mode (Step 302) and advances to Step 303. For example, when the mute mode is on, the control signal is a signal indicating that the mute mode is turned on, for example, a signal of "mute mode ON". When the mute mode is off, the control signal is a signal indicating that the mute mode is turned off, for example, a signal of "mute mode OFF".

When the setting of the mute mode is not changed in Step 301 (No in Step 301), the CPU 101 returns again to Step 301. In Step 303, the CPU 101 outputs the above control signal to the AV amplifier 200 via the HDMI source 116 and advances to Step 304. In Step 304, the CPU 101 ends the operation shown in the flowchart of FIG. 5 when the TV 100 is powered off, or returns to Step 301 and continues the operation shown in the flowchart of FIG. 5 when the TV 100 is being powered on.

Next, referring to FIG. 6, the flowchart of the AV amplifier 200 regarding the above mute mode will be described.

As in the case of FIG. 4, it is assumed that the CPU 201 of the AV amplifier 200 receives the AV signal and the control signal via the HDMI sink 204. The CPU 201 inputs the audio signal out of the AV signal from the HDMI sink 204 to the audio processing unit 208 or the like.

In Step 401, the CPU 201 checks a change in the control signal received from the HDMI sink 204. When there is no change in the control signal, the CPU 201 returns to Step 401 and continues checking the control signal. When there is a change in the control signal, the CPU 201 advances to Step 402. When in Step 402, the change in the control signal is a change from "mute mode OFF" to "mute mode ON", the CPU 201 interprets the setting of the mute mode as ON and advances to Step 404 when in Step 402, the change in the control signal is a change from "mute mode ON" to "mute mode OFF", the CPU 201 interprets the setting of the mute mode as OFF and advances to Step 403.

In Step 404, the CPU 201 stops the output from the audio processing unit 208 to the audio drive unit 209 and does not perform an audio output to the speaker 213. In Step 403, the CPU 201 permits the output from the audio processing unit 208 to the audio drive unit 209 and performs the audio output to the speaker 213.

In the flowcharts of FIGS. 3 and 4, the example in which the sound can be prevented from being outputted from the speaker 213 connected to the AV amplifier 200 when the headphones 400 are connected to the TV 100 while supporting the setting of the storage into the HDD 210 made by the user is shown. If the setting of the storage into the HDD 210 is made by the user and the control signal corresponding to the mute setting made by the user is generated, also in the processing of FIGS. 5 and 6, it is possible to control an audio output from the speaker 213 based on the mute setting made by the user while supporting the setting of the storage into the HDD 210 made by the user. The operation thereof is the same as that of FIGS. 3 and 4, and therefore detailed description thereof is omitted.

It should be noted that the embodiments according to the present invention are not limited to the embodiments described above, and other various embodiments are conceivable.

In FIG. 1, the example in which the HDD 210 is built into the AV amplifier 200 is shown, but an HDD externally connected to the AV amplifier 200 (or another audio control apparatus) is also suitable. "Externally connected" may be "locally connected" or may be "connected via a network such as Ethernet or the Internet".

The embodiments shown in FIGS. 3 to 6 are not limited to the case where the control signal is transmitted and received via the HDMI. The transmission and reception may be performed, for example, via a LAN (Local Area Network) using an IP (Internet Protocol), via Wi-Fi (Wireless Fidelity), or via other interfaces. Alternatively, the transmission and reception may be performed via wireless or via wire.

Figure 7:
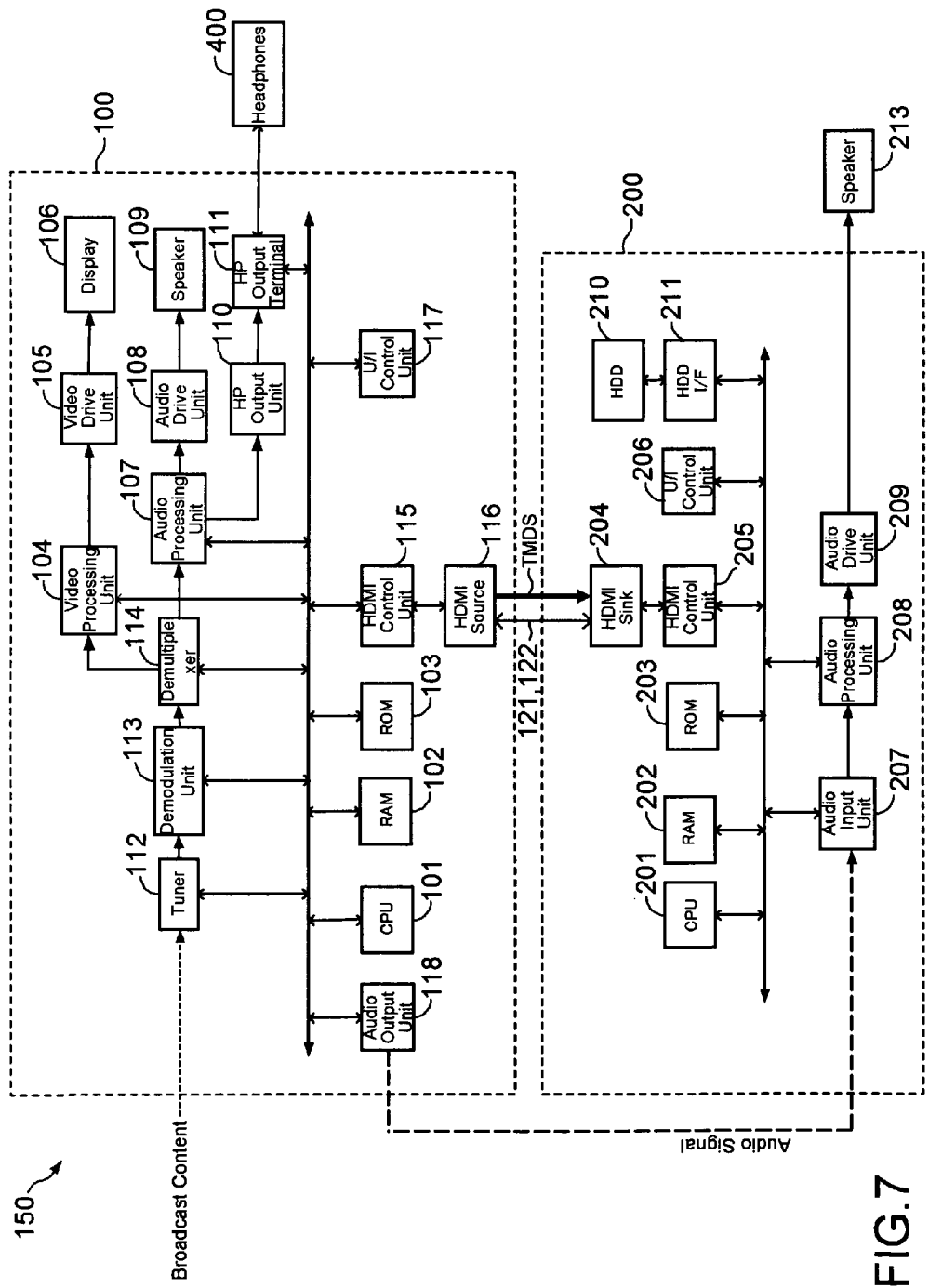
FIG. 7 is a block diagram showing a configuration of an audio control system according to another embodiment of the present invention.

FIG. 7 is a block diagram showing a configuration of an audio control system according to another embodiment of the present invention. In the following description, descriptions on blocks and so on similar to those included in the audio control system 50 according to the embodiment shown in FIG. 1 or the like will be simplified or omitted, and different points will be mainly described.

An audio control system 150 includes an audio output unit 118. The audio output unit 118 functions as an output means for outputting the audio signal processed by the audio processing unit 107 to the AV amplifier 200 in a format different from the HDMI format. The audio signal outputted from the above audio output unit 118 is inputted to the audio input unit 207 of the AV amplifier 200. As already described with reference to FIG. 1, the audio output unit 118 and the audio input unit 207 have an RCA or digital (for example, optical digital) interface. In the case of the optical digital interface, the audio output unit 118 can also output the audio signal compressed in a predetermined format. The audio input unit 207 receives this compressed audio signal. Examples of the predetermined format include MP3 (MPEG-1 Audio Layer-3), ATRAC (Adaptive TRansform Acoustic Coding), AAC (Advanced Audio Coding), WMA (Windows Media Audio), and other formats.

The same applies to the audio input unit 207 in FIG. 1.

Incidentally, the TV 100 may include a video output unit which outputs the video signal processed by the video processing unit 104 in a format different from the HDMI format. The format different from the HDMI format is, for example, an RCA, S-video, component video, or D-video format.

The audio signal outputted from the audio output unit 118 and inputted to the audio input unit 207 is processed by the audio processing unit 208 and outputted to the speaker 213 by drive of the audio drive unit 209. When this audio signal is the compressed audio signal, the audio processing unit 208 performs decoding processing or the like on the compressed audio signal and outputs the audio signal to the audio drive unit 209.

Also in the audio control system 150 according to this embodiment, the processing shown in FIGS. 3 and 4 can prevent the sound from being outputted from the speaker 213 connected to the AV amplifier 200 when the headphones 400 are connected to the TV 100. Alternatively, the processing shown in FIGS. 5 and 6 allows the audio control system 150 to control the audio output from the speaker 213 based on the mute setting made by the user.

Further, the audio control system 150 has the following advantage when the audio signal obtained by the audio output unit 118 and the audio input unit 207 is the above compressed audio signal. First, because of the compressed audio signal, the data amount is smaller than that in the HDMI format, and hence the transfer efficiency improves. Secondly, when the AV amplifier 200 stores compressed data of the compressed audio signal in the HDD 210, the compressed data can be stored in the HDD 210 as it is. Specifically, the encoding processing of the audio signal by the audio processing unit 208 becomes unnecessary, whereby the load on the AV amplifier 200 can be reduced.

Figure 8:
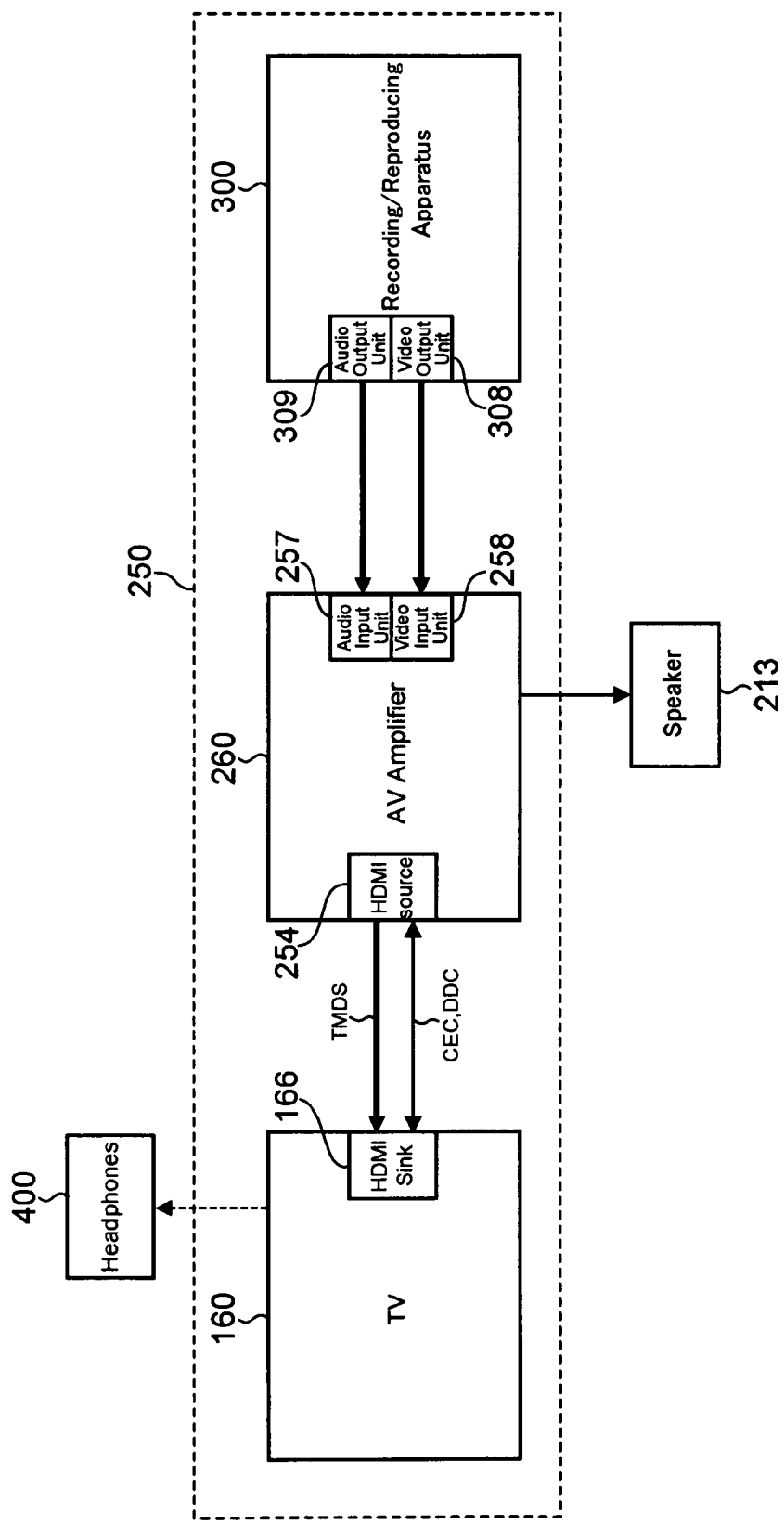
FIG. 8 is a block diagram showing a configuration of an audio control system according to still another embodiment of the present invention.

FIG. 8 is a block diagram showing a configuration of an audio control system according to still another embodiment of the present invention.

An audio control system 250 includes a TV 160 as an audio input apparatus, an AV amplifier 260 as an audio control apparatus, and a recording/reproducing apparatus 300 as an audio transmission apparatus. It is sufficient that the TV 100 and the AV amplifier 200 described with reference to FIG. 1 or 7 basically be used as the TV 160 and the AV amplifier 260, respectively. The speaker 213 is connected to the AV amplifier 260. The AV amplifier 260 may be a device in which the speaker 213 and the AV amplifier 260 are integrated.

The recording/reproducing apparatus 300 is, for example, an apparatus to record and reproduce audio and/or video. Examples of a recording medium for its audio and/or video signal include a hard disk, an optical disk, a semiconductor memory, and other recording media. The recording/reproducing apparatus 300 may be an apparatus dedicated to reproduction and not recording. Hereinafter, descriptions will be given assuming that the recording/reproducing apparatus 300 is an apparatus capable of recording and reproducing both the audio signal and the video signal.

The TV 160 and the AV amplifier 260 in FIG. 8 and the TV 100 and the AV amplifier 200 in FIG. 1 or 7 are different in two points. One point is that regarding an HDMI sink 166 (input means) of the TV 160 and an HDMI source 254 of the AV amplifier 260, the source and the sink have exchanged places. The other point is that the AV amplifier 260 includes an audio input unit 257 (audio input means) and a video input unit 258 to which the audio signal and the video signal outputted from the recording/reproducing apparatus 300 are inputted, respectively. Except for these configurations of the TV 160 and the AV amplifier 260 of FIG. 8, the configurations thereof are the same as those of the TV 100 and the AV amplifier 200, and descriptions thereof are thus omitted.

Incidentally, when the AV amplifier 260 is dedicated to audio, an embodiment in which the video input unit 258 is not provided is also conceivable.

In the audio control system 250, it is also possible to further provide an HDMI which becomes a source in the TV 160 and further provide an HDMI which becomes a sink in the AV amplifier 260.

The audio input apparatus is not limited to the TV 160 and may be any apparatus such as a computer (PC, for example) or a game machine as long as it is an apparatus to which audio is inputted from the AV amplifier. Similarly, the audio control apparatus is not limited to the AV amplifier 260 and may be a device such as a computer (PC, for example) or a selector. The same goes for the TV 100 and the AV amplifier 200 shown in FIG. 1 or 7.

Figure 9:
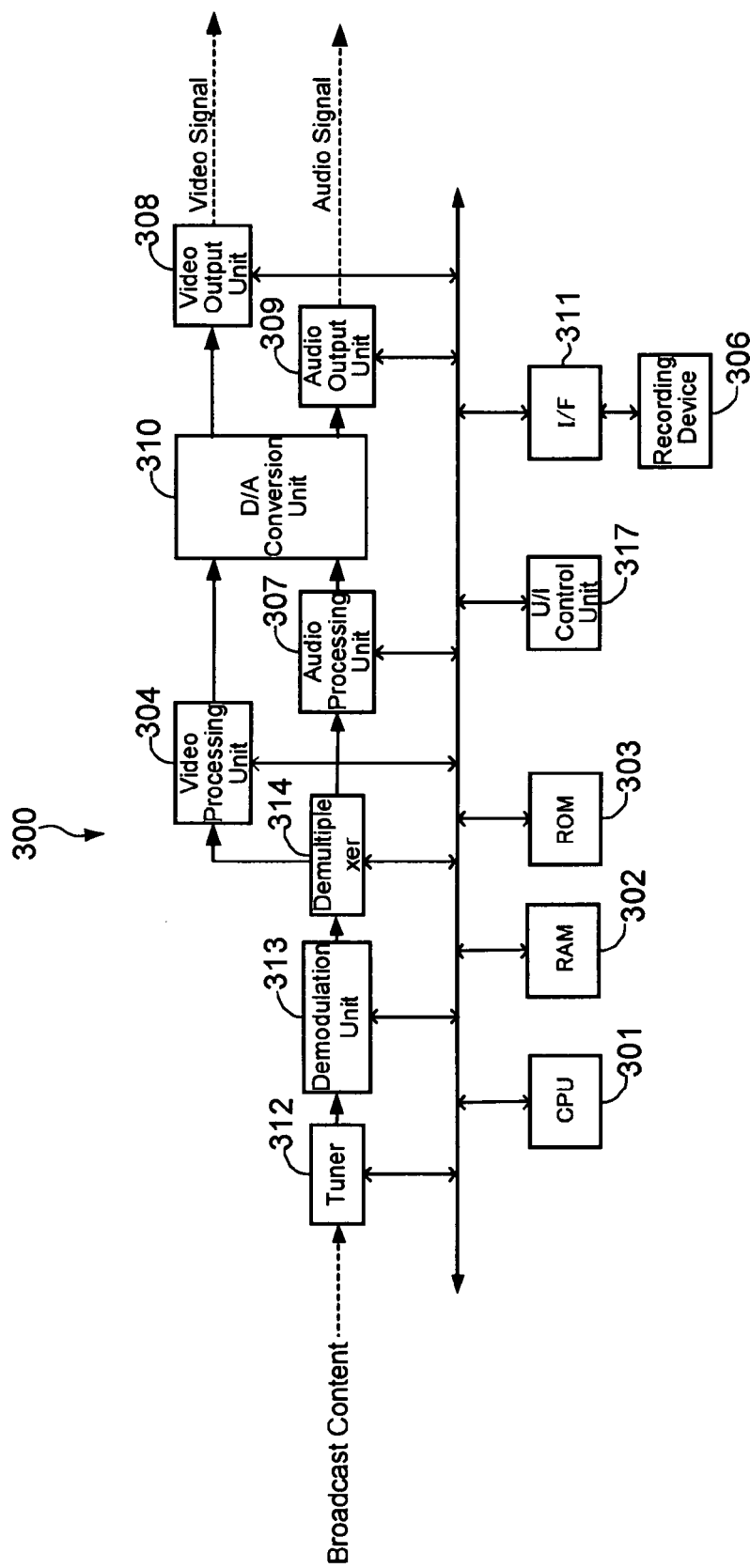
FIG. 9 is a block diagram showing a configuration of a recording/reproducing apparatus in FIG. 8.

FIG. 9 is a block diagram showing a configuration of the recording/reproducing apparatus 300.

The recording/reproducing apparatus 300 includes a CPU 301, a RAM 302, a ROM 303, a tuner 312, a demodulation unit 313, a demultiplexer 314, a video processing unit 304, an audio processing unit 307, a U/I control unit 317, a D/A conversion unit 310, a video output unit 308, an audio output unit 309, a recording device 306, and an interface 311 for the recording device 306.

The CPU 301, the RAM 302, the ROM 303, the tuner 312, the demodulation unit 313, the demultiplexer 314, the video processing unit 304, the audio processing unit 307, and the U/I control unit 317 respectively perform the same processing as the CPU 101, the RAM 102, the ROM 103, the tuner 112, the demodulation unit 113, the demultiplexer 114, the video processing unit 104, the audio processing unit 107, and the U/I control unit 117 of the TV 100 shown in FIG. 1 or 7.

The video output unit 308 and the audio output unit 309 each may be the HDMI or may be an interface in a format different from that of the HDMI (such as RCA, S-video, D-video, component video, or optical digital audio). When the video output unit 308 and the audio output unit 309 each perform a digital output, the D/A conversion unit 310 is not used, and when performing an analog output, the D/A conversion unit 310 is used.

The audio input unit 257 and the video input unit 258 of the AV amplifier 260 are in formats corresponding to the interfaces of the audio output unit 309 and the video output unit 308. The format is, for example, the HDMI, RCA, S-video, D-video, component video, or optical digital audio format as described above.

Examples of the recording device 306 include a hard disk, an optical disk, a semiconductor memory, a magnetic tape, or other recording media as described above.

The D/A conversion unit 310 is used when the above video output unit 308 and audio output unit 309 are analog interfaces. Typically, the D/A conversion unit 310 converts video data and audio data mainly subjected to decoding processing in the video processing unit 304 and the audio processing unit 307 into analog signals and transmits these analog signals to the AV amplifier via the video output unit 308 and the audio output unit 309.

When the tuner 312 is a tuner to receive an analog signal, the recording/reproducing apparatus 300 includes a decoder (for example, NTSC (National Television System Committee)) corresponding to analog broadcast waves. This decoder is sometimes provided in the TV 160. Moreover, the recording/reproducing apparatus 300 includes an encoder to convert the received analog signal into a digital signal in a predetermined format such as MPEG, and records audio and/or video data encoded by this encoder in a recording device.

The audio transmission apparatus is not limited to the recording/reproducing apparatus 300, and an example thereof includes an apparatus including no recording device for an audio signal, such as a radio receiver. Alternatively, any apparatus that can transmit audio may be used.

In the audio control system 250 thus configured, the TV 160 and the AV amplifier 260 respectively perform the same processing as in FIGS. 3 and 4. As a premise for the audio control system 250 to perform the processing of FIGS. 3 and 4, the recording/reproducing apparatus 300 reproduces an audio signal and/or a video signal (hereinafter referred to as AV signal) recorded in the recording device 306, and transmits the AV signal to the AV amplifier 260 via the video output unit 308 or the audio output unit 309. Alternatively, as a premise for the audio control system 250 to perform the processing of FIGS. 3 and 4, the recording/reproducing apparatus 300 reproduces the AV signal received by the tuner 312 and outputs this AV signal to the AV amplifier 260 via the video output unit 308 or the audio output unit 309. In these cases, the AV signal outputted from the recording/reproducing apparatus 300 is inputted to the AV amplifier 260 via the audio input unit 257 and the video input unit 258. The AV amplifier 260 outputs this AV signal via the HDMI source 254 and outputs the audio signal to the external speaker 213. The TV 160 receives the AV signal transmitted from the HDMI source 254 of the AV amplifier 260 via the HDMI sink 166.

Specifically, as the premise for performing the operation of the audio control system 250, the AV signal reproduced by the recording/reproducing apparatus 300 is outputted from the display 106 and/or the speaker 109 of the TV 160 via the AV amplifier 260, and the audio signal is outputted from the speaker 213.

Referring to FIG. 3, the CPU 101 of the TV 160 checks whether or not the headphones 400 are connected to the HP output terminal 111 (Step 101) and advances to Step 102. In Step 102, when detecting a change in connection status, for example, from connection to non-connection or from non-connection to connection, the CPU 101 advances to Step 103. When detecting no change in connection status, the CPU 101 returns to Step 101. In Step 103, the CPU 101 generates a control signal according to whether or not the headphones 400 are connected to the HP output terminal 111, and advances to Step 104. This control signal is, for example, a signal of "headphones present" or a signal of "no headphones" as described above.

In Step 104, the CPU 101 transmits the control signal of "headphones present" or "no headphones" to the HDMI sink 166 and outputs the signal to the AV amplifier 260 via the HDMI, and advances to Step 105. This control signal is outputted via the CEC line 122. In Step 105, the CPU 101 checks the power status of the TV 160, and the CPU 101 ends the operation shown in the flowchart of FIG. 3 when the power is off, or returns to Step 101 when the power is on.

Control in which Step 102 is deleted and Step 101 advances directly to Step 103 in the flowchart of FIG. 3 is also conceivable. In this case, the CPU 101 checks whether or not the headphones 400 are connected to the HP output terminal 111 (Step 101), generates the control signal based on a result of the check, and outputs the control signal to the AV amplifier 260 via the HDMI, a detailed description of which is omitted here.

The AV amplifier 260 transmits the AV signal and communicates the control signal via the HDMI source 254. In the flowchart of FIG. 4, the CPU 201 of the AV amplifier 260 checks the above control signal via the HDMI source 254 (Step 201) and advances to Step 202. This control signal is inputted via the CEC line 122. In Step 202, when there is a change in the control signal (for example, from the control signal of "headphones present" to the control signal of "no headphones"), the CPU 201 advances to Step 203. When there is no change in the control signal, the CPU 201 returns to Step 201.

In the case of the change from the control signal of "headphones present" to the control signal of "no headphones", the CPU 201 advances from Step 203 to Step 205. In the case of the change from the control signal of "no headphones" to the control signal of "headphones present", the CPU 201 advances from Step 203 to Step 204. In Step 204, the CPU 201 controls the audio processing unit 208 so that an audio output from the audio processing unit 208 to the audio drive unit 209 is stopped. In Step 205, the CPU 201 controls the audio processing unit 208 so that the audio output from the audio processing unit 208 to the audio drive unit 209 is permitted. When the processing of Steps 204 and 205 ends, the CPU 201 advances to Step 206 and ends the operation shown in the flowchart of FIG. 4 when the AV amplifier is powered off. When the AV amplifier is being powered on, the CPU 201 returns to Step 201 and continues the operation shown in the flowchart of FIG. 4.

As just described, the audio output of the AV amplifier 260 to the speaker 213 is controlled according to the connection status of the headphones 400 to the TV 160. Consequently, when the headphones 400 are connected to the TV 160, sound can be prevented from being outputted from the speaker 213 connected to the AV amplifier 260. In other words, the AV amplifier 260 performs mute control without the user manipulating the AV amplifier 260, which can save the user the trouble of manipulation.

Moreover, the audio control system 250 according to this embodiment can perform the same processing as in the flowcharts of FIGS. 5 and 6 described above, detailed descriptions of which are omitted. Also in this case, as a premise for performing the operations of the audio control system 250 of FIGS. 5 and 6, the AV signal reproduced by the recording/reproducing apparatus 300 is outputted from the display 106 and/or the speaker 109 of the TV 160 via the AV amplifier 260, and the audio signal is outputted from the speaker 213.

Further, also in this embodiment, the CPU 201 can perform the above four (a to d) controls on the audio signal from the TV 160 received by the HDMI source 254. Furthermore, in the operations of FIGS. 3 and 4, the above four (0, 1, 2, 3) control signals may be used.

Figure 10:
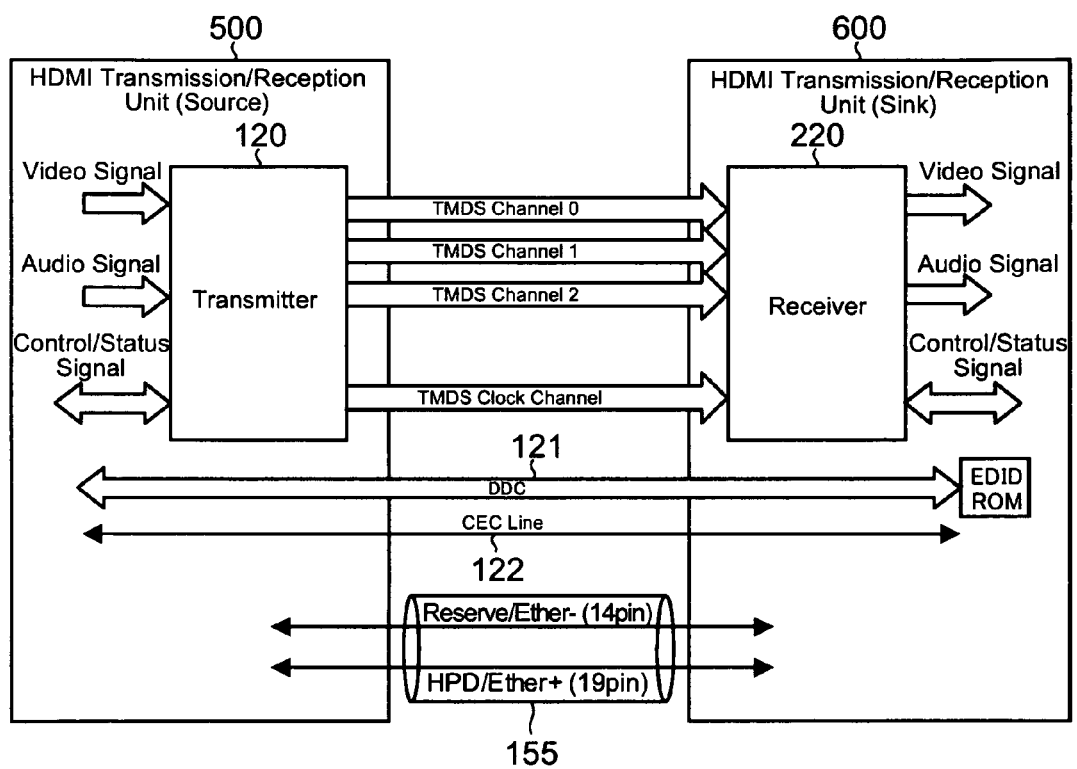
FIG. 10 is a block diagram showing an electrical configuration of an HDMI according to another embodiment of the present invention.

FIG. 10 is a block diagram showing an electrical configuration of an HDMI according to another embodiment of the present invention. In FIG. 10, the transmitter 120 of an HDMI transmission/reception unit (source) 500, the receiver 220 of an HDMI transmission/reception unit (sink) 600, the DDC line 121, and the CEC line 122 are used to perform the same processing as in FIG. 2, so the same reference symbols are given thereto and detailed descriptions thereof are thus omitted.

A generally-used HDMI of the related art is provided with a pin for an HPD (Hot Plug Detect) line and a pin for a reserve line as signal lines for a source device to detect whether or not a sink device is connected. For example, in an HDMI of a type A, pin No. 19 is used as the HPD pin, and pin No. 14 is used as the reserve pin.

In the HDMI shown in FIG. 10, the HPD line and the reserve line are connected as a differential twisted pair for expansion so that the pair functions as a high-speed data line 155 capable of performing bidirectional IP communication through differential signal transmission. In FIG. 10, in this high-speed data line 155, a pin corresponding to the HPD pin of the related art is referred to as HPD/Ether$^+$ and a pin corresponding to the reserve pin of the related art is referred to as Reserve/Ether$^-$.

Such a configuration makes it possible to perform bidirectional high-speed IP communication by Ethernet using the HDMI while maintaining compatibility with the HDMI of the related art. The maximum transmission rate of this high-speed data line is, but not limited to, approximately 100 Mbps.

In particular, when the HDMI in FIG. 10 is applied to the above audio control system 50, 150, or 250, the "control signals" shown in FIGS. 3 to 6 may be communicated by the high-speed data line 155.

Alternatively, for example, the line connecting the audio output unit 118 and the audio input unit 207 shown in FIG. 7 may be replaced with the high-speed data line 155 included in the HDMI shown in FIG. 10. The same applies to the HDMI sink 166 and the HDMI source 254 shown in FIG. 8, and the same goes also in a case where the audio output unit 309, the video output unit 308, the audio input unit 257, and the video input unit 258 are each the HDMI.

What is claimed is:

1. An audio output apparatus which outputs an audio signal to an audio control apparatus controlling processing of the audio signal, the audio output apparatus being connectable to an external device having an external terminal, the audio output apparatus comprising:

an output terminal to which the external terminal is connected and which outputs the audio signal to the external device via the external terminal;

a detecting means for detecting whether or not the external terminal is connected to the output terminal;

a generating means for generating a control signal based on a result of the detection by the detecting means; and a transmitting means for transmitting the control signal to the audio control apparatus in order that the audio control apparatus controls the processing of the audio signal based on the control signal, the control signal being transmitted via a hot plug detect line and a reserve line connected as a differential twisted pair, the control signal being selectable from among at least four possible signals including a first signal specifying that recording is permitted and that the external device is connected, a second signal specifying that recording is permitted and that the external device is not connected, a third signal specifying that recording is not permitted and that the external device is connected, and a fourth signal specifying that recording is not permitted and that the external device is not connected.

2. The audio output apparatus as set forth in claim 1, wherein the external device is one of headphones, earphones, a head-mounted speaker, and a stationary speaker.

3. An audio control apparatus to which an audio signal outputted from an audio output apparatus is inputted, the audio output apparatus having an output terminal outputting the audio signal to an external device via an external terminal of the external device, the audio control apparatus comprising:

an audio processing unit processing the audio signal;

a receiving means for receiving, when the audio output apparatus detects whether or not the external terminal is connected to the output terminal, a control signal based on a result of the detection; and a control means for controlling the processing of the audio signal by the audio processing unit based on the control signal, the control signal being received via a hot plug detect line and a reserve line connected as a differential twisted pair, the control signal being selectable from among at least four possible signals including a first signal specifying that recording is permitted and that the external device is connected, a second signal specifying that recording is permitted and that the external device is not connected, a third signal specifying that recording is not permitted and that the external device is connected, and a fourth signal specifying that recording is not permitted and that the external device is not connected.

4. The audio control apparatus as set forth in claim 3, wherein the control means controls the audio processing unit so that an output of the audio signal from the audio processing unit is stopped based on the control signal when it is detected that the external terminal is connected to the output terminal, and controls the audio processing unit so that the output of the audio signal from the audio processing unit is permitted based on the control signal when it is detected that the external terminal is not connected to the output terminal.

5. An audio control system to which an external device having an external terminal is connectable, comprising:

an audio output apparatus outputting an audio signal to the external device and includes an output terminal outputting the audio signal to the external device via the external terminal, a detecting means for detecting whether or not the external terminal is connected to the output terminal, a generating means for generating a control signal based on a result of the detection by the detecting means, and a transmitting means for transmitting the control signal; and an audio control apparatus including an audio processing unit to which the outputted audio signal is inputted and which processes the inputted audio signal, a receiving means for receiving the control signal, and a control means for controlling the processing of the audio signal by the audio processing unit based on the control signal, the control signal being transmitted via a hot plug detect line and a reserve line connected as a differential twisted pair, the control signal being selectable from among at least four possible signals including a first signal specifying that recording is permitted and that the external device is connected, a second signal specifying that recording is permitted and that the external device is not connected, a third signal specifying that recording is not permitted and that the external device is connected, and a fourth signal specifying that recording is not permitted and that the external device is not connected.

6. An audio control method, comprising:

detecting whether or not an external terminal of an external device is connected to an output terminal, the output terminal being operable to output an audio signal to the external device via the external terminal;

generating a control signal based on a result of the detection;

transmitting the control signal;

receiving the control signal; and controlling processing of the audio signal by an audio processing unit based on the control signal, the control signal being transmitted via a hot plug detect line and a reserve line connected as a differential twisted pair, the control signal being selectable from among at least four possible signals including a first signal specifying that recording is permitted and that the external device is connected, a second signal specifying that recording is permitted and that the external device is not connected, a third signal specifying that recording is not permitted and that the external device is connected, and a fourth signal specifying that recording is not permitted and that the external device is not connected.

7. The audio control method as set forth in claim 6, wherein the audio signal is outputted from an audio output apparatus having the output terminal, wherein the control signal is transmitted from the audio output apparatus having the output terminal, and wherein an audio control apparatus, comprising the audio processing unit and to which the audio signal outputted from the audio output apparatus is inputted, receives the transmitted control signal and controls the processing of the audio signal by the audio processing unit based on the received control signal.

* * * * *